US009563367B2

(12) United States Patent
Chu et al.

(10) Patent No.: US 9,563,367 B2
(45) Date of Patent: Feb. 7, 2017

(54) LATENCY COMMAND PROCESSING FOR SOLID STATE DRIVE INTERFACE PROTOCOL

(71) Applicant: HGST Netherlands B.V., Amsterdam (NL)

(72) Inventors: Frank Chu, Milpitas, CA (US); Zvonimir Z. Bandic, San Jose, CA (US); Dejan Vucinic, San Jose, CA (US); Cyril Guyot, San Jose, CA (US); Qingbo Wang, Irvine, CA (US)

(73) Assignee: HGST Netherlands B.V., Amsterdam (NL)

( * ) Notice: Subject to any disclaimer, the term of this patent is extended or adjusted under 35 U.S.C. 154(b) by 50 days.

(21) Appl. No.: 14/469,225

(22) Filed: Aug. 26, 2014

(65) Prior Publication Data
US 2016/0062669 A1    Mar. 3, 2016

(51) Int. Cl.
G06F 3/06    (2006.01)
(52) U.S. Cl.
CPC ........... *G06F 3/0611* (2013.01); *G06F 3/0659* (2013.01); *G06F 3/0679* (2013.01)
(58) Field of Classification Search
CPC ...... H04L 67/26; G06F 3/0613; G06F 3/0679; G06F 3/0659; G06F 3/0611; G06F 3/0656; G06F 3/0688; G06F 3/0605; G06F 13/4059
See application file for complete search history.

(56) References Cited

U.S. PATENT DOCUMENTS

| 8,032,686 | B2 | 10/2011 | O'Brien et al. |
| 8,356,127 | B2 * | 1/2013 | Hampel ............... G06F 13/1668 710/118 |
| 8,407,377 | B1 | 3/2013 | Shapiro et al. |
| 2012/0246435 | A1 | 9/2012 | Meir et al. |
| 2012/0290768 | A1 | 11/2012 | Rubowitz |
| 2013/0086311 | A1 | 4/2013 | Huang et al. |
| 2013/0135816 | A1 | 5/2013 | Huang |
| 2013/0187935 | A1 * | 7/2013 | Wexler ................. G06F 9/5027 345/505 |
| 2013/0191590 | A1 | 7/2013 | Malwankar |
| 2013/0198312 | A1 | 8/2013 | Tamir et al. |
| 2013/0297852 | A1 * | 11/2013 | Fai ........................ G11C 16/12 711/103 |

(Continued)

FOREIGN PATENT DOCUMENTS

WO    WO-2013/109640 A1    7/2013

OTHER PUBLICATIONS

HGST, "NVMe2: Adding a Low Latency Command Class," SJRC Storage Architecture, 8 pages (Sep. 13, 2013).
(Continued)

*Primary Examiner* — Hashem Farrokh
(74) *Attorney, Agent, or Firm* — Wilmer Cutler Pickering Hale and Dorr LLP (57) ABSTRACT

The present disclosure relates to methods, apparatuses, systems, and computer program products for processing commands for accessing solid state drives. Example methods can include receiving, from a host, a loaded command availability message. The loaded command availability message can indicate that a command associated with the loaded command availability message uses a low latency mode. The methods can further include executing the associated command.

17 Claims, 6 Drawing Sheets

(56) References Cited

U.S. PATENT DOCUMENTS

| 2014/0047141 A1* | 2/2014 | Sadeghi | G06F 13/4291 |
| | | | 710/56 |
| 2014/0101342 A1* | 4/2014 | Colenbrander | G06F 13/12 |
| | | | 710/14 |
| 2015/0006663 A1* | 1/2015 | Huang | G06F 13/00 |
| | | | 709/213 |

OTHER PUBLICATIONS

Marks, Kevin, "An NVM Express Tutorial," Flash Memory Summit, Santa Clara, CA, 92 pages (2013).
No Author Listed, "Proposal for NVMe2: SJRC Storage Architecture," PowerPoint presentation, 8 pages (No date listed).
SNIA, "Solid State Storage Initiative," PCIe SSD 101, an Overview of Standards, Markets and Performance, 32 pages (Aug. 2013).

* cited by examiner

LATENCY COMMAND PROCESSING FOR SOLID STATE DRIVE INTERFACE PROTOCOL

FIELD OF THE DISCLOSURE

The present disclosure relates to systems and methods for supporting latency command processing in a solid state drive (SSD) interface protocol.

BACKGROUND

Solid state drives (SSDs) have become popular storage devices in client, server, and enterprise environments. The increasing popularity of SSDs is partially due to significant performance benefits when compared to hard drives, coupled with rapidly improving price points. An SSD interface protocol specifies how a controller on an SSD receives commands for processing, and transmits data between a host and the SSD over a communication interface. To enable faster adoption and interoperability of SSDs connected to a host over a peripheral component interconnect express (PCIe) bus, industry participants have defined an SSD interface protocol known as the non-volatile memory express (NVMe) standard. NVMe includes a register programming interface, command set, and feature set definition. These NVMe features enable related companies and SSD manufacturers to write drivers for each operating system that are compliant with standard specifications, and enable interoperability between implementations which shortens testing and qualification cycles.

Performance relating to processing of commands received according to an SSD interface protocol can be measured in different ways, including throughput and latency. Throughput measures how much work the controller can perform in a unit time, such as a computing cycle. For example, throughput can measure how much data the host and/or controller can transfer over an interface in a given amount of time. Higher throughput generally improves performance. Latency measures how much delay exists between transmission of a command or data from the host, to completion of the command by the controller. Lower latency generally also improves performance.

SUMMARY

The present disclosure relates to methods, apparatuses, systems, and computer program products for processing commands for accessing solid state drives.

In one embodiment, the present disclosure describes a method of processing a command for accessing a solid state device. The method can include receiving, from a host, a loaded command availability message. The loaded command availability message can indicate that a command associated with the loaded command availability message uses a low latency mode. The method can further include executing the associated command.

In one embodiment, the present disclosure describes a controller. The controller can include an interface and at least one processor in communication with the interface. The interface can be configured for transmitting data and commands between a controller and a host. For example, the interface can be configured for receiving, from the host, a loaded command availability message. The loaded command availability message can indicate that a command associated with the loaded command availability message uses a low latency mode. The processor can be further configured for executing the associated command.

In one embodiment, the present disclosure describes a non-transitory computer program product for processing a command for accessing a solid state device. The computer program product can be tangibly embodied in a computer-readable medium. The computer program product can include instructions operable to cause a data processing apparatus to receive, from a host, a loaded command availability message. The loaded command availability message can indicate that a command associated with the loaded command availability message uses a low latency mode. The computer program product can also include instructions operable to cause the data processing apparatus to execute the associated command.

The embodiments described herein may include additional aspects. For example, the methods, systems, apparatuses, and computer program products can further include processing a completion of the executed command without generating an interrupt and without writing a completion entry to a normal completion queue on the host, and, upon receiving, from the host, a subsequent command, presuming an acknowledgement by the host of the processed completion. The methods, systems, apparatuses, and computer program products may further include fetching remaining physical region pages (PRP) and/or remaining scatter gather lists (SGL). The loaded command availability message can include fields for direct memory access (DMA) information, a logical block address (LBA), a completion address, security information, and a length. The DMA information can include physical region pages (PRP), a pointer to additional physical region pages (PRP), and/or a pointer for scatter gather lists (SGL). The receiving the loaded command availability message can further include polling by a latency command processing module substantially periodically and retrieving a remainder of the loaded command availability message for execution. The methods, systems, apparatuses, and computer program products may further include classifying the associated command as at least one of a latency class command and a compact class command. The receiving the loaded command availability message can include receiving the loaded command availability message from a latency command processing module, and the latency command processing module can include a physical queue or a logical queue on the host. The accessing the solid state drive can be according to a non-volatile memory express (NVMe) standard modified for latency command processing.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DETAILED DESCRIPTION

The present disclosure relates to creating a class of command operations that can enable short latency processing, also referred to herein as latency commands. The command operations can improve input/output (I/O) command processing over, for example, a peripheral component interconnect express (PCIe) bus. In one embodiment, the latency command processing can operate in conjunction with a solid state drive (SSD) interface protocol. The SSD interface protocol can specify how a controller on an SSD receives commands for processing and transmits data between a host and the SSD over an interface. In some embodiments, the SSD interface protocol can modify a traditional Non-Volatile Memory Express (NVMe) standard that was originally designed for use with throughput command processing.

The latency command processing can improve over a traditional NVMe protocol. For example, the traditional NVMe protocol can use high command queue depth (i.e., high numbers of commands that can be buffered) to achieve high I/O per second (IOPS) in some applications such as NAND-type flash memory SSDs. The latency command processing can be added easily into the NVMe standard, and commands processed as latency commands can be treated as higher priority commands beyond traditional priority arbitration schemes for commands processed as throughput commands according to the NVMe standard in an NVMe device.

The present disclosure describes a set of commands that operate within an SSD interface protocol such as the NVMe standard, but whose command processing proceeds through a different route that can avoid overhead associated with traditional implementations. Specifically, the system can categorize commands as throughput commands or latency commands. As used herein, the term "throughput command" refers a command processed by the controller in a mode of operation in which the controller enables high throughput for an application. Throughput commands can benefit from command processing that enables high throughput but can also incur overhead that can slow down the command processing initially. As used herein, the term "latency command" refers to a command processed by the controller in a mode of operation in which the controller enables short and consistent latency for an application. The terms "latency command" and "throughput command" may not imply that one command is a latency command and a different command is a throughput command. Instead, the terms "latency command" and "throughput command" can identify when a received command is processed by the controller in a particular mode of operation.

Examples of commands that can benefit from latency command processing can include commands defined in the NVMe standard such as Read, Write, and/or Flush commands. In some embodiments, the system can complete the same data transfer using either a latency command or a throughput command, at different points in time and according to different application needs. For example, a command to Read 4 KB of data from an SSD can be processed as a throughput command. Accordingly, an application may only request high throughput, such as for video playback. Video playback may not need a prompt initial response (i.e., may not benefit visibly from low latency commands). For example, the controller may take an extra 50 microseconds or so to process the first Read 4 KB command, with later Read commands arriving consecutively. One benefit of retrieving video data using throughput commands can be that video playback may benefit from being able to transfer large amounts of data over a period of time and show higher quality video as a result (i.e., may benefit from high throughput). Therefore, at any given time, an application using throughput command processing may receive requested large amount of data faster with high throughput, than with low latency.

The same operation, Read 4 KB of data, can also be executed using latency command processing. An example of an application that may prefer low latency can be a news feed or weblog feed. The news feed application can prefer shorter latency so that the news feed can display updated news items faster, and benefit from latency command processing. However, the news feed application may not use as much data as a video application and may gain less benefit from throughput command processing. For example, the news feed application may prefer a tradeoff of issuing the Read 4 KB command and receiving initial results relatively faster (i.e., relatively lower latency) to provide a responsive application to the user, at the expense of potentially waiting longer overall to receive the full 4 KB of data as requested (i.e., relatively longer latency). Therefore, the news feed application can prefer latency command processing, without incurring a slowdown in initial performance exhibited by throughput command processing.

For throughput command processing, the system can queue throughput commands for arbitration and scheduling, which can allow higher priority throughput commands to receive earlier processing. For latency command processing, the system can process latency commands directly, without a need for arbitration and scheduling. Furthermore, a host can send the latency commands directly to a storage device such as an SSD. In some embodiments, the host can then poll in a predictive way, to identify when the controller has completed processing the latency command. In some embodiments, the host can identify a corresponding completion entry sent from the device into host memory. These improvements can avoid the overhead of a traditional "doorbell" message and interrupt used for throughput command processing. The traditional doorbell message can signal the storage device that there is a new throughput command waiting. In response, the storage device can initiate a memory access request, for example a direct memory access (DMA) request, to retrieve the command from a queue in host dynamic random access memory (DRAM).

The latency command processing can be available for read and write commands. The host can prepare the latency commands in a shorter format for processing, compared to a traditional 64-byte command format defined in the NVMe standard. In some embodiments, associated fields can include IDs, physical region pages (PRP), physical region page (PRP) pointers or scatter gather list (SGL) pointers, logical block addresses (LBAs), completion address, and the like. In further embodiments, the queue depth for latency commands can be limited to 1-2 entries or more, based on device characteristics, system implementation and application scenarios. As described earlier, the system can avoid traditional queuing of throughput command completion, which can have potentially high overhead. Instead, the system can send completion entries immediately to the host, and retire old entries if new entries are written in.

Improving interfaces, protocols, and storage in computer systems can improve performance. The move to flash-memory-based storage has happened concurrently with development of interface protocols that exploit the potential of flash memory in storage-based technologies.

Performance is generally measured according to throughput and latency, which generally have a positive correlation. For example, during random read/write operations, throughput can be positively correlated with shorter latency. Because of practical limitations in design and implementation of corresponding storage controllers, it is sometimes advantageous to compromise throughput for latency. For example, enabling short and consistent latency can provide better control to an application for enhanced prediction of read/write data expected to be sent over an interface when the time interval used for sending and receiving can be predicted to be short and consistent. However, the amount of data that can be processed during a given time period can decrease due to a lower number of commands used to transmit the data. Some applications can benefit specially from short and consistent latency. In traditional implementations, ten microsecond or longer latency can be generally incurred for data access to a storage device. This large latency can be sufficient for NAND flash-based SSD, but ten microsecond latency can be too long for next generations of storage class memory, projected to have access latencies of twenty to one hundred nanoseconds. Examples of storage that can benefit from the latency command processing can include phase change memory (PCM), magnetoresistive random access memory (MRAM), ferroelectric random access memory (FeRAM), resistive random access memory (ReRAM), and other next-generation memory types. Furthermore, some embodiments of the latency command processing can integrate well with existing SSD interface protocol standards, such as NVMe, and therefore can be more easily accepted for inclusion into those standards.

Figure 1:
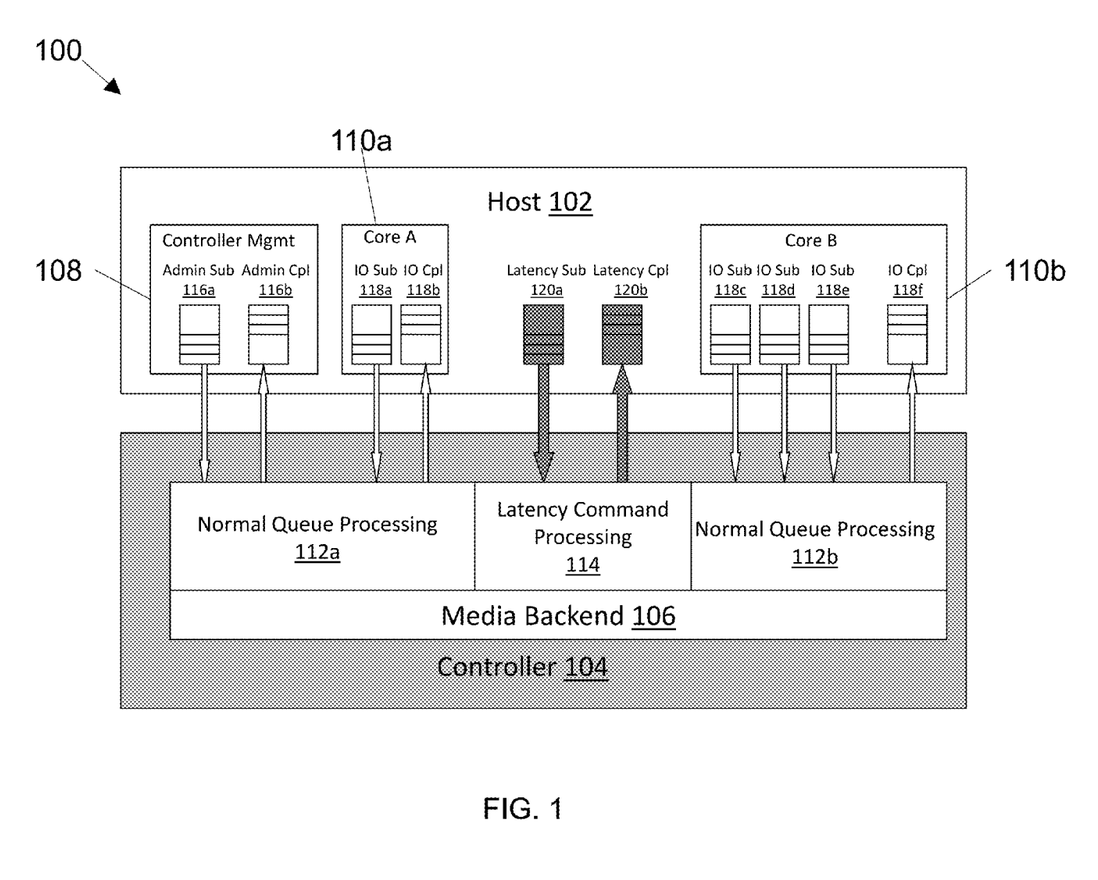
FIG. 1 illustrates an example system for latency command processing, in accordance with some embodiments of the present disclosure.

FIG. 1 illustrates an example system 100 for latency command processing, in accordance with some embodiments of the present disclosure. System 100 can include host 102 in communication with controller 104 over an interface. Controller 104 can include normal queue processing modules 112a-112b and latency command processing module 114. Normal queue processing modules 112a-112b can operate on throughput commands. Latency command processing module 114 can operate on latency commands. In some embodiments, latency command processing module 114 can be a logical queue for processing latency commands. In other embodiments, latency command processing module 114 can be a physical queue for processing latency commands. Controller 104 can also include media backend 106. Host 102 can include controller management module 108 and cores A and B (110a, 110b). Host 102 can also include submission queues 116a, 118a, 118c-118e, and 120a. Host 102 can further include completion queues 116b, 118b, 118f, and 120b.

The NVMe standard generally defines a queuing interface, command set, and feature set specifying how a host sends and receives commands and data to and from SSDs over an interface. In some embodiments, the interface can be a peripheral component interconnect express (PCIe) bus interface. NVMe specifies drivers for an operating system and higher layer applications and programs to interact with a storage device, along with specifying a consistent feature set, development tools, and testing support. Latency command processing can generally be used with systems including server caching, server storage, client storage, and external storage.

System 100 uses queues 116a-120b to buffer messages for sending from and receiving by host 102. In some embodiments, queues 116a-120b can be circular queues that buffer and transmit commands and command completion messages. Queues 116a-120b can be located anywhere in PCIe memory, though typically queues 116a-120b can be located in host memory. Queues 116a-120b can consist of a contiguous block of physical memory, or a non-contiguous set of physical memory pages defined by a physical region page (PRP) list. Queues 116a-120b can generally store a minimum of 1 to a maximum of about 65,536 entries for I/O queues 118a-118f, and a minimum of 1 to a maximum of about 4,096 entries for admin queues 116a-116b.

Queues 116a-120b include admin queues 116a-116b, I/O queues 118a-118f, and latency queues 120a-120b. Admin queues 116a-116b can handle device management and control. Specifically, admin queues 116a-116b can process certain controller management and feature management operations such as creation and deletion of I/O queues 118a-118f or aborting commands. Admin queues 116a-116b can buffer and transmit commands from a set of allowable admin commands. Admin queues 116a-116b also can configure I/O queues 118a-118f and latency queues 120a-120b. System 100 typically contains one set of admin queues 116a-116b per storage controller, with up to about 4,096 elements per queue.

I/O queues 118a-118f can manage sets of allowable I/O commands, including submitting and completing I/O commands. In some embodiments, there can be up to about 65,536 I/O queues 118a-118f per storage controller, with up to about 65,536 elements per queue. Similarly, latency queues 120a-120b can manage sets of latency commands, including submitting and completing latency commands.

Queues 116a-120b can be further subdivided into submission queues 116a, 118a, 118c-118e, 120a and completion queues 116b, 118b, 118f, 120b. Submission queues 116a, 118a, 118c-118e, 120a can submit commands to controller 104 by queuing commands from host 102. Completion queues 116b, 118b, 118f, 120b can inform host 102 of completed commands by queuing messages from controller 104 back to host 102. Generally, commands submitted by host 102 on a specific submission queue can complete on a specific completion queue. System 100 can allow multiple submission queues to map onto a single completion queue. For example, core B (110b) illustrates multiple submission queues 118c-118e mapping to single completion queue 118f.

The NVMe standard specifies queues for host 102, whereas NVMe does not require storage devices including controller 104 to provide the same physical queues. That is, storage devices should work and interoperate with queues 116a-120b, but the standard does not require the storage devices themselves to provide the same queues as required of hosts. Controller 104 uses normal queue processing modules 112a-112b to process throughput commands received from host 102. Specifically, controller 104 can use normal queue processing module 112a for processing commands from admin submission queue 116a and I/O submission queue 118a, and normal queue processing module 112b for processing commands from I/O submission queues 118c-118e. Normal queue processing module 112a also sends messages back to host 102 via admin completion queue 116b and I/O completion queue 118b. Similarly, normal queue processing module 112*b* sends messages back to host 102 via I/O completion queue 118*f*.

Controller 104 can also use latency command processing module 114 to process latency commands. Controller 104 can use latency command processing module 114 to process latency commands received from latency submission queue 120*a*, and to send messages back to host 102 via latency completion queue 120*b*. Devices can generally have limits on how many commands they are capable of processing concurrently, which can be related to a queue depth of the storage device and host. Furthermore, in some embodiments, controller 104 can include physical queues or buffers at different stages during the life of a command when controller 104 is processing the command. In some embodiments, controller 104 can use special expedited queues for certain commands such as latency commands.

Figure 2A:
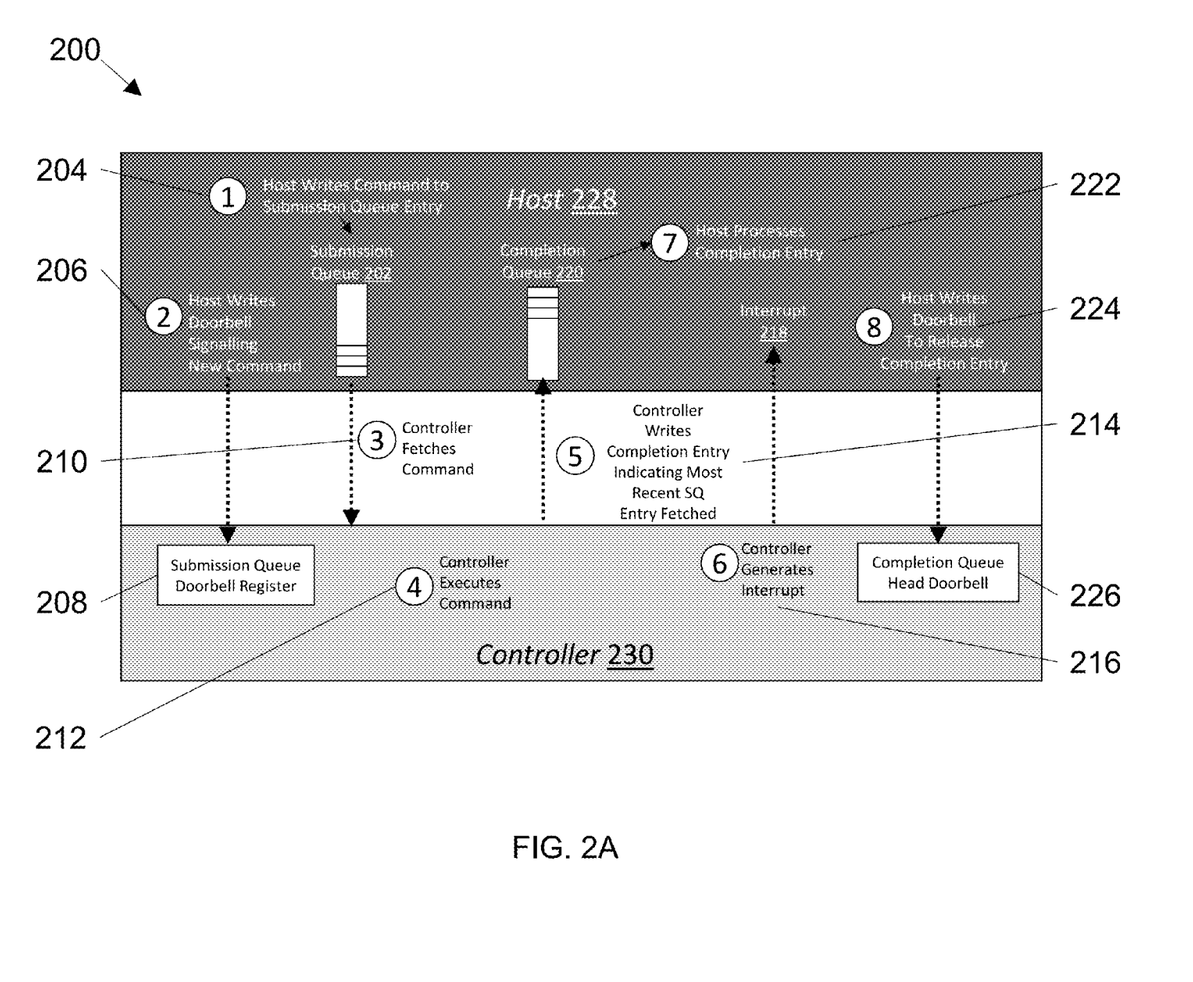
FIG. 2A illustrates example operation of throughput command processing, in accordance with some embodiments of the present disclosure.

FIG. 2A illustrates example operation of throughput command processing, in accordance with some embodiments of the present disclosure. System 200 includes host 228 and controller 230, in communication over an interface such as a PCIe bus interface.

To process a throughput command, host 228 can insert an admin or I/O command into submission queue 202 (step 204). In general, system 200 can support a large number of queues (up to about 65,536, depending on capabilities of controller 230) with large queue depth (up to about 65,536 entries per queue). These queues can be suitable for applications benefiting from high throughput, but also can introduce undesirable delays in latency including queuing delays and processing overhead. For example, in some embodiments system 200 can also support arbitration and scheduling, to select submission queues from the large number of queues for processing. The arbitration and scheduling allows for higher throughput performance when processing commands, but introduces undesirable delays in latency due to increased processing time accounting for round robin processing, priority classes, and weighting. Furthermore, system 200 can support assigning priority classes to submission queues. For example, queues, or commands in the queues, can be labeled admin, urgent priority, high priority, medium priority, or low priority. System 200 can further support round robin processing to process commands received from multiple queues, or weighted round robin processing to account for the priority classes when processing commands received from multiple queues. Both round robin processing and weighted round robin processing, as well as delays introduced due to queuing, can add undesirable processing time for latency commands.

Host 228 can signal availability of the new throughput command to controller 230 (step 206), also referred to herein as writing a doorbell or ringing a doorbell. The command availability message, or doorbell, can alert controller 230 to the presence of a new throughput command in submission queue 202 for controller 230 to process. In some embodiments, controller 230 can poll doorbell register 208 periodically and can retrieve the head, or earliest, entry from submission queue 202 when an entry is identified. However, in combination with queuing for arbitration and scheduling, the infrastructure used by polling doorbell register 208 for discovering and processing the doorbell and corresponding throughput command by host 228 and controller 230 can add ten microseconds or more to processing times over a PCIe interface. The added ten microseconds or more can increase latency delays for a single throughput command.

Controller 230 can fetch the throughput command from submission queue 202 for processing (step 210), and proceed to execute the fetched throughput command (step 212).

Upon completion of the executed throughput command, controller 230 can write a completion entry into completion queue 220 (step 214). The completion entry can indicate successful completion of the throughput command most recently fetched from submission queue 202. Controller 230 next generates an interrupt (step 216). In some embodiments, interrupt 218 can be a legacy interrupt, a message-signaled interrupt (MSI), and/or an extended message-signaled interrupt (MSI-X) generated in accordance with the peripheral component interconnect express (PCIe) standard and transmitted over the PCIe bus. Host 228 can receive interrupt 218 and process the completion entry from completion queue 220 (step 222). Host 228 can send another doorbell message, to release the completion entry from completion queue 220 (step 224). For example, Host 228 can write a doorbell 226 for controller 230 to process. The completion and interrupt processing described herein can also add latency for every throughput command.

Figure 2B:
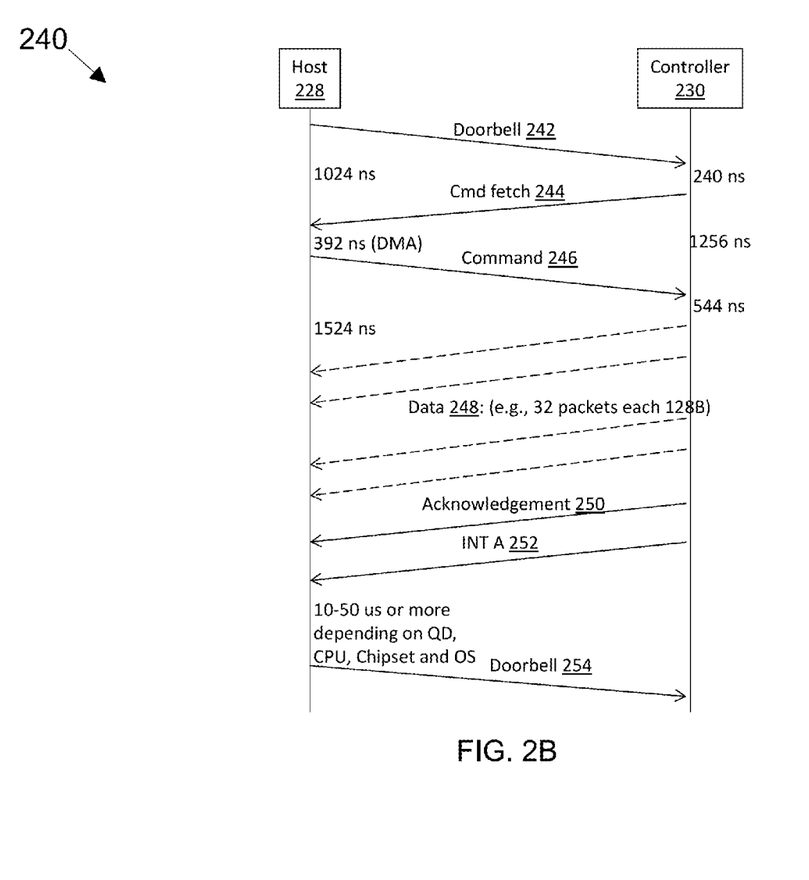
FIG. 2B illustrates a timing diagram for example throughput command processing, in accordance with some embodiments of the present disclosure.

FIG. 2B illustrates a timing diagram 240 for example throughput command processing, in accordance with some embodiments of the present disclosure. Timing diagram 240 illustrates example messages transmitted between host 228 and controller 230 for processing a four-kilobyte read request.

Host 228 can send a doorbell message to controller 230 (step 242) to announce availability of the new throughput command. Controller 230 can send a command fetch message to host 228 (step 244). In practice, controller 230 can take more than 240 nanoseconds to receive the doorbell over the PCIe interface, and take a similar amount of time to process the doorbell before generating the command fetch message. From the perspective of host 228, 1024 nanoseconds or more can have elapsed since host 228 sent the doorbell.

Host 228 can receive the command fetch message and, in response, sends the requested throughput command (step 246) from the submission queue. Host 228 can take about 392 nanoseconds to process the received command fetch message and retrieve the command entry directly from memory (e.g., using direct memory access (DMA)). Controller 230 can process the throughput command and proceeds to send the requested data (step 248), which can be about 32 packets with each packet being 128 bytes, for a total of about 4 KB data transfer.

When controller 230 has sent all data successfully, controller 230 can send an acknowledgement of completion message (step 250) and interrupt (step 252). In some embodiments, the interrupt can be a legacy interrupt. In other embodiments, controller 230 can also send other types of interrupts such as message signaling interrupts (MSI) or extended message signaling interrupts (MSI-X). Host 228 sends another doorbell message (step 254) to release the completion entry from its completion queue after finishing transmission. The processing time required for receiving, processing, and generating the interrupt and corresponding doorbell can introduce additional latency ranging from about 10 microseconds to more than 50 microseconds. These additional latencies can be too slow for the performance characteristics of next-generation storage devices. The amount of additional latency introduced can depend on factors such as queue depth, operating system, CPU capability, and chipset.

Figure 3A:
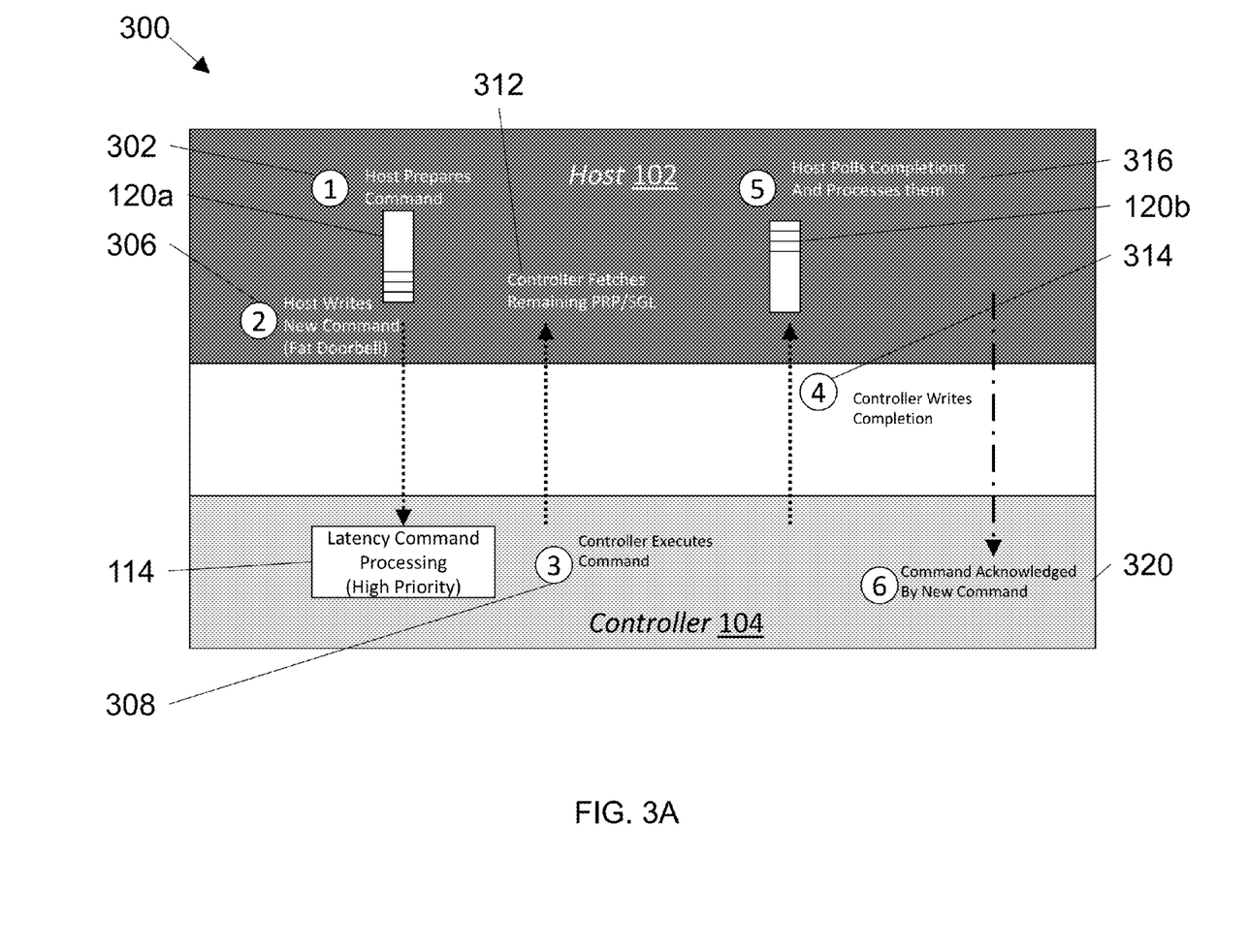
FIG. 3A illustrates example operation of latency command processing, in accordance with some embodiments of the present disclosure.

FIG. 3A illustrates example operation of latency command processing, in accordance with some embodiments of the present disclosure. System 300 can include host 102 and controller 104, in communication over an interface such as a PCIe bus interface.

System 300 can relate to creating a class of command operations that can enable short latency command processing, also referred to herein as latency commands. To process the latency commands, host 102 prepares the latency command (step 302) and inserts the latency command into latency submission queue 120a for processing by controller 104. In some embodiments, latency submission queue 120a can be a physical queue or a logical queue. The latency commands described herein can generally be used for read commands or write commands from host 102. Host 102 performs memory writes of the latency commands to storage controller 104. The latency commands can exhibit limited variations in required command processing time, in contrast to traditional throughput commands that can vary greatly in the amount of time needed to complete.

Host 102 writes a loaded command availability message identifying the new latency command into the controller, for example via latency command processing module 114 (step 306). In some embodiments, host 102 can write the loaded command availability message directly to the device, for example via a PIO operation. In other embodiments, host 102 can write the loaded command availability message using direct memory access (DMA) or similar techniques such as a core bus interface unit in an x86 architecture. In some embodiments, latency command processing module 114 can be a logical queue for receiving the loaded command availability message. In some embodiments, the logical queue can have a different physical implementation than a physical queue, such as a few registers or a corresponding small amount of memory. The implementation of the logical queue can be treated conceptually similar to a physical queue, even if the implementation of the logical queue can be different from a physical queue. In other embodiments, latency command processing module 114 can be a physical queue.

The loaded command availability message is described as "loaded" because the loaded command availability message can contain information for processing the latency command either partially or entirely within the message. In some embodiments, the loaded command availability message is referred to herein as a "fat doorbell." Unlike with a traditional doorbell message, controller 104 can save time by retrieving the latency command from the loaded command availability message. A traditional "doorbell" message signals to a controller that a traditional command (e.g., a throughput command) is available. Upon receiving the traditional doorbell message, the controller can fetch the traditional throughput command from a submission queue in the host. Thus, the loaded command availability message can allow controller 104 to avoid extra time otherwise used in a traditional implementation to fetch the throughput command from the submission queue in the host.

In some embodiments, the size of the loaded command availability message can be 32 bytes or shorter. Examples of fields transmitted in the loaded command availability message can include direct memory access (DMA) information, a device logical block address (LBA) for reading or writing memory contents, a completion address, security information, or other fields as needed. In some embodiments, the DMA information can include length information and pointer for physical region pages (PRP) or length information and pointer for scatter gather lists (SGL). In some embodiments, the size of the loaded command availability message can vary based on the fields transmitted by host 102. For example, if host 102 transmits more fields, the loaded command availability message can be closer to 32 bytes in size. If host 102 transmits fewer fields, the loaded command availability message can use less space.

Physical region page (PRP) entries can specify physical memory locations in host memory for use in data transfers. In general, the latency command can include two PRP entries for specifying two corresponding locations for data in host memory. If more than two PRP entries are used to describe the data buffer, then the latency command can include a pointer or other reference to a PRP List that describes a list of PRP entries. A scatter gather list (SGL) can allow transfer of data to and from multiple memory areas in a single direct memory access (DMA) transaction. SGL is analogous to chaining together multiple simple DMA requests. In some embodiments, for large lists of PRP or SGL, controller 104 on the device uses direct memory access (DMA) from host memory, based on hints identified in the first packet.

Controller 104 retrieves the loaded command availability message from latency command processing module 114 and executes the latency command corresponding to the fields included in the loaded command availability message (step 308). In some embodiments, latency command processing module 114 can represent a special logical or physical queue inside the drive. Latency command processing module 114 can be polled by hardware substantially periodically. In contrast to queues used for throughput commands, entries in latency submission queue 120a and latency command processing module 114 may not participate in arbitration and scheduling with other non-latency requests, thereby saving additional processing time otherwise needed for arbitration and scheduling. Latency commands also can have higher priority over throughput commands, so that they are processed first with shorter wait times. Queue depth for latency submission queue 120a and latency command processing module 114 can be larger than 1. In executing the latency command, controller 104 also fetches remaining physical region page (PRP) data and scatter gather list (SGL) data (step 312) referenced in the loaded command availability message.

Upon completion of the latency command, controller 104 inserts a completion message into latency completion queue 120b (step 314). Host 102 polls periodically or substantially continually for completion messages in latency completion queue 120b, and processes the inserted completion message (step 316). In some embodiments, host 102 avoids polling over the PCIe interface, which can further improve latency times. In further embodiments, host 102 polls continually based on a predicted arrival time of the completion message. This direct polling and predicted arrival time further improve performance for latency commands.

Host 102 can avoid handling an interrupt and sending a follow-on traditional doorbell message, as would be used for a traditional throughput command. Instead, upon receiving a new command from host 102 such as a throughput command or latency command, controller 104 presumes an acknowledgement of successful processing of the inserted completion message (step 320). In some embodiments, host 102 can perform a memory write of small amounts of data and use logical block addressing (LBA) for direct access to the drive. For example, the use of the small amounts of data can introduce a third class of commands such as compact commands, in addition to throughput commands and latency commands. Example uses for compact commands include reading or writing file metadata or other metadata to the storage device, or for non-block operations generally. In some embodiments, the compact commands can be processed using a loaded command availability message in a manner similar to latency commands.

Figure 3B:
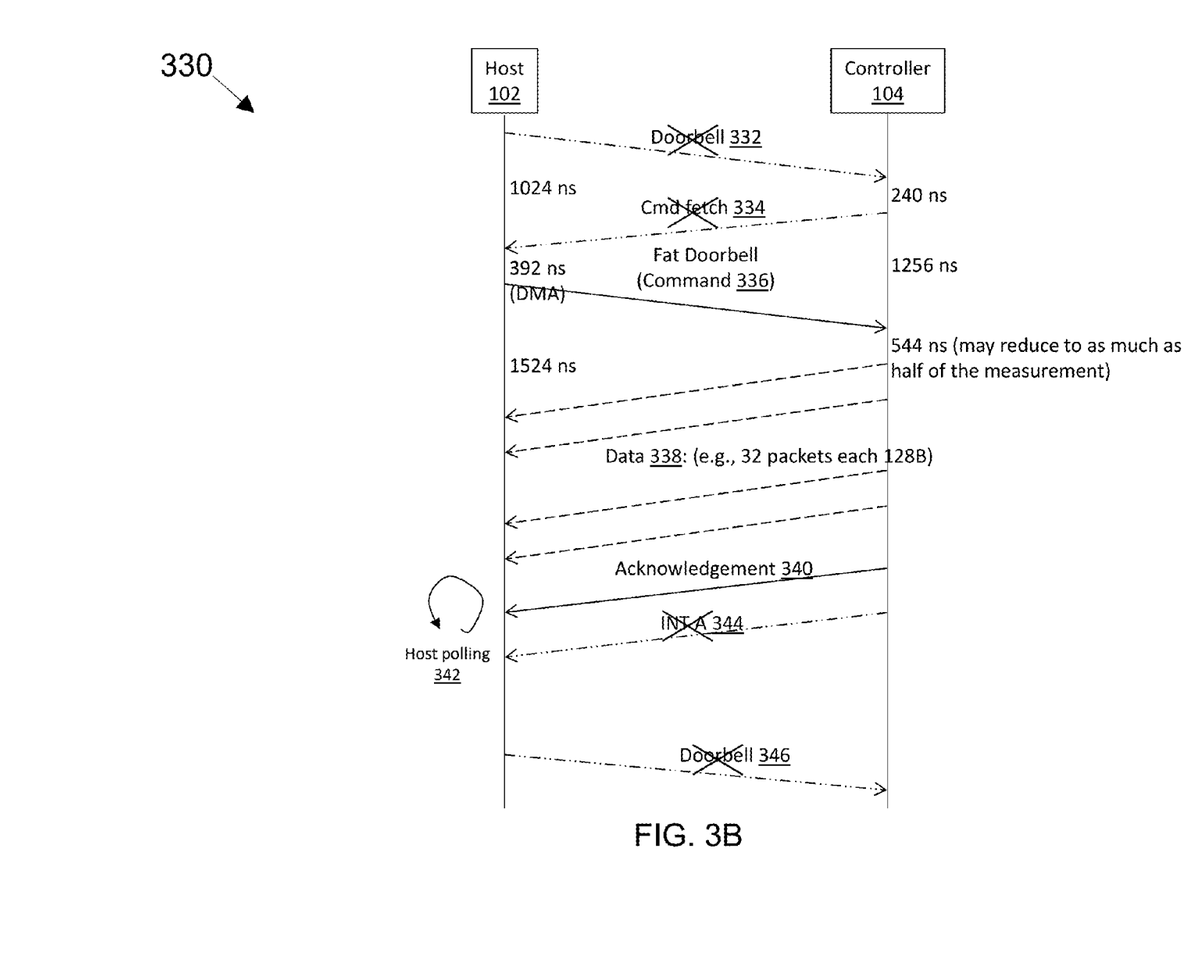
FIG. 3B illustrates a timing diagram for example latency command processing, in accordance with some embodiments of the present disclosure.

FIG. 3B illustrates a timing diagram 330 for example latency command processing, in accordance with some embodiments of the present disclosure. Timing diagram 330 illustrates example messages transmitted between host 102 and controller 104 for processing a 4 kilobyte read request.

As described earlier, host 102 avoids the need to send a traditional doorbell message (step 332), as would be needed for a traditional throughput command. Controller 104 thereby avoids the need to perform a command fetch (step 334) from the submission queue. Compared with FIG. 2B, the system is therefore able to avoid the about 1024 nanoseconds and about 392 nanoseconds of delay identified in the host and the controller while processing throughput commands.

Instead, host 102 can transmit a loaded command availability message (step 336). Upon receiving the loaded command availability message, controller 104 can process the loaded command availability message including the latency command using the latency command processing module (e.g., a logical queue or physical queue). In some embodiments, the latency command processing module can save processing overhead compared with the original 544 nanoseconds illustrated. An example amount of processing overhead saved can be about half of the 544 nanoseconds, or 272 nanoseconds or more. Controller 104 transmits the requested data back to host 102 (step 338). Upon transmission of all requested data, controller 104 sends an acknowledgement message of completion back to host 102 (step 340).

Host 102 can perform periodic or substantially continuous polling of the completion queue (step 342). In some embodiments, host 102 also uses a prediction of expected arrival time to inform the polling. Therefore, controller 104 avoids additional overhead inherent in sending a traditional interrupt (step 344) and host 102 avoids sending the next command availability message (e.g., traditional doorbell), and the completion queue entry is available for use (step 346). Compared with FIG. 2B, the system is able to avoid the about 10-50 microseconds of additional delay introduced by traditional interrupt processing and next traditional doorbell message. Avoiding this traditional processing further improves performance of the latency commands.

Figure 4:
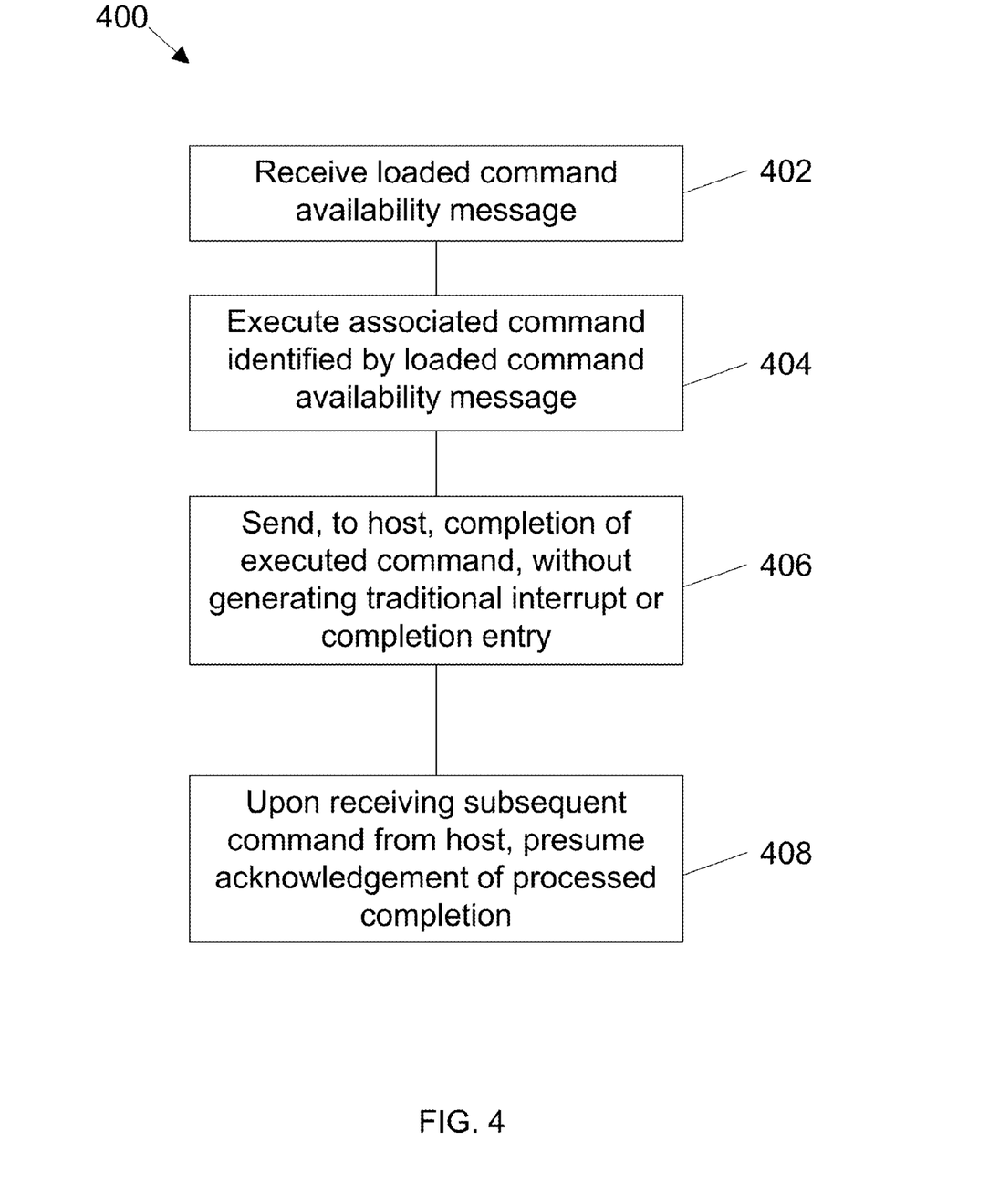
FIG. 4 illustrates a flowchart of an example method for processing latency commands, in accordance with some embodiments of the present disclosure.

FIG. 4 illustrates a flowchart of an example method 400 for processing latency commands, in accordance with some embodiments of the present disclosure. The storage controller receives a loaded command availability message, or fat doorbell message (step 402). The storage controller executes a received latency command associated with the received loaded command availability message (step 404). Upon successful execution of the received latency command and transmission of any requested data (i.e., data requested to be read or written), the storage controller sends, to the host, a completion of the executed latency command, without generating a traditional interrupt or a traditional completion entry as would be required for processing a traditional throughput command (step 406). Upon receiving a subsequent command from the host, the storage controller presumes an acknowledgement by the host of the processed completion (step 408). In this way, the storage controller is able to avoid the overhead of receiving a further acknowledgement message from the host.

Those skilled in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, or partitioned in a different way) all without departing from the scope of the subject technology.

Furthermore, an implementation of the methods and systems described herein can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The methods can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

The present disclosure has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method of processing a command for accessing a solid state device, the method comprising:
   receiving, from a host, a loaded command availability message, wherein the loaded command availability message indicates that a command associated with the loaded command availability message uses a low latency mode, wherein the loaded command availability message includes fields for:
   direct memory access (DMA) information,
   a logical block address (LBA),
   a completion address,
   security information, and a length; and
   executing the associated command.

2. The method of claim 1, further comprising:
   processing a completion of the executed command without generating a traditional interrupt and without writing a completion entry to a normal completion queue on the host; and upon receiving, from the host, a subsequent command, presuming an acknowledgement by the host of the processed completion.

3. The method of claim 1, further comprising fetching at least one of remaining physical region pages (PRP) and remaining scatter gather lists (SGL) upon a condition that the at least one of the remaining PRP and the remaining SGL exist.

4. The method of claim 1, wherein the receiving the loaded command availability message further comprises polling by a latency command processing module substantially periodically and retrieving a remainder of the loaded command availability message for execution.

5. The method of claim 1, further comprising classifying the associated command as at least one of a latency class command and a compact class command.

6. The method of claim 1, wherein the accessing the solid state drive is according to a non-volatile memory express (NVMe) standard modified for latency command processing.

7. A controller comprising:
an interface; and
at least one processor in communication with the interface, the processor configured for:
receiving, over the interface, a loaded command availability message, wherein the loaded command availability message indicates that a command associated with the loaded command availability message uses a low latency mode, wherein the loaded command availability message includes fields for:
direct access memory (DMA) information,
a logical block address(LBA),
a completion address,
security information, and a length; and
executing the associated command.

8. The controller of claim 7, wherein the processor is further configured for:
processing a completion of the executed command without generating an interrupt and without writing a completion entry to a normal completion queue on the host; and
upon receiving, over the interface, a subsequent command, presuming an acknowledgement by the host of the processed completion.

9. The controller of claim 7, wherein the processor is further configured for fetching at least one of remaining physical region pages (PRP) and remaining scatter gather lists (SGL) upon a condition that the at least one of the remaining PRP and the remaining SGL exist.

10. The controller of claim 7, wherein the processor configured for receiving the loaded command availability message further comprises the processor configured for polling by a latency command processing module substantially periodically and retrieving a remainder of the loaded command availability message for execution.

11. The controller of claim 7, wherein the processor is further configured for classifying the associated command as at least one of a latency class command and a compact class command.

12. A computer program product for processing a command for accessing a solid state device, the computer program product tangibly embodied in a non-transitory computer-readable medium, the computer program product including instructions operable to cause a data processing apparatus to:
receive a loaded command availability message, wherein the loaded command availability message indicates that a command associated with the loaded command availability message uses a low latency mode, wherein the loaded command availability message includes fields for:
direct access memory (DMA) information,
a logical block address(LBA),
a completion address,
security information, and a length;
execute the associated command;
process a completion of the executed command without generating an interrupt and without writing a completion entry to a completion queue on the host; and
upon receiving a subsequent command, presume an acknowledgement by the host of the processed completion.

13. The computer program product of claim 12, further comprising instructions operable to cause the data processing apparatus to:
process a completion of the executed command without generating an interrupt and without writing a completion entry to a normal completion queue on the host; and
upon receiving a subsequent command, presume an acknowledgement by the host of the processed completion.

14. The computer program product of claim 12, further comprising instructions operable to cause the data processing apparatus to fetch at least one of remaining physical region pages (PRP) and remaining scatter gather lists (SGL) upon a condition that the at least one of the remaining PRP and the remaining SGL exist.

15. The computer program product of claim 12, wherein the instructions operable to cause the data processing apparatus to receive the loaded command availability message further comprise instructions operable to cause the data processing apparatus to poll using a latency command processing module substantially periodically and retrieve a remainder of the loaded command availability message for execution.

16. The computer program product of claim 12, further comprising instructions operable to cause the data processing apparatus to classify the associated command as at least one of a latency class command and a compact class command.

17. The computer program product of claim 12, wherein the computer program product for accessing the solid state device accesses the solid state device according to a non-volatile memory express (NVMe) standard modified for latency command processing.

* * * * *